US010498573B2

(12) United States Patent
Shen

(10) Patent No.: US 10,498,573 B2
(45) Date of Patent: *Dec. 3, 2019

(54) SYSTEMS AND METHODS FOR COMBINING SIGNALS FROM MULTIPLE ACTIVE WIRELESS RECEIVERS

(71) Applicant: Aviat U.S., Inc., Santa Clara, CA (US)

(72) Inventor: Ying Shen, Chapel Hill, NC (US)

(73) Assignee: Aviat U.S., Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/679,900

(22) Filed: Apr. 6, 2015

(65) Prior Publication Data
US 2015/0215143 A1    Jul. 30, 2015

Related U.S. Application Data

(63) Continuation of application No. 14/044,762, filed on Oct. 2, 2013, now Pat. No. 9,036,514, which is a
(Continued)

(51) Int. Cl.
H04L 27/22    (2006.01)
H04L 27/00    (2006.01)
(Continued)

(52) U.S. Cl.
CPC .............. *H04L 27/22* (2013.01); *H04B 1/10* (2013.01); *H04L 27/0002* (2013.01); *H04L 27/2334* (2013.01)

(58) Field of Classification Search
CPC ........ H04B 7/08; H04B 7/0837; H04B 7/084; H04B 7/0842; H04B 7/0848;
(Continued)

(56) References Cited

U.S. PATENT DOCUMENTS 4,270,207 A * 5/1981 Gutleber ................. H04B 7/22
327/551
4,369,520 A * 1/1983 Cerny, Jr. ............ H04B 7/0857
342/367
(Continued)

OTHER PUBLICATIONS

International Application No. PCT/US2011/053843, International Search Report and Written Opinion dated Jan. 20, 2012.

*Primary Examiner* — David B Lugo
(74) *Attorney, Agent, or Firm* — Sheppard, Mullin, Richter & Hampton LLP

(57) ABSTRACT

Systems and methods for combining signals from multiple active wireless receivers are discussed herein. An exemplary system comprises a first downconverter, a phase comparator, a phase adjuster, and a second downconverter. The first downconverter may be configured to downconvert a received signal from a first antenna to an intermediate frequency to create an intermediate frequency signal. The phase comparator may be configured to mix the received signal and a downconverted signal to create a mixed signal, compare a phase of the mixed signal to a predetermined phase, and generate a phase control signal based on the comparison, the downconverted signal being associated with the received signal from the first antenna. The phase adjuster may be configured to alter the phase of the intermediate frequency signal based on the phase control signal. The second downconverter may be configured to downconvert the phase-shifted intermediate frequency signal to create an output signal.

24 Claims, 10 Drawing Sheets

Related U.S. Application Data continuation of application No. 13/248,002, filed on Sep. 28, 2011, now Pat. No. 8,570,920.

(60) Provisional application No. 61/388,483, filed on Sep. 30, 2010.

(51) Int. Cl.
*H04B 1/10* (2006.01)
*H04L 27/233* (2006.01)

(58) Field of Classification Search
CPC .. H04B 7/0857; H04B 7/0862; H04B 7/0868; H04L 27/0002; H04L 27/22
See application file for complete search history.

(56) References Cited

U.S. PATENT DOCUMENTS

| | | | | |
|---|---|---|---|---|
| 4,386,435 A | * | 5/1983 | Ulmer | H04B 7/084 455/139 |
| 5,140,615 A | * | 8/1992 | Jasper | H04B 7/0865 375/347 |
| 5,668,839 A | * | 9/1997 | Bernasconi | H04B 7/0851 375/267 |
| 6,484,013 B1 | | 11/2002 | Ishii | |
| 6,535,721 B1 | * | 3/2003 | Burke | H04B 7/0871 455/137 |
| 6,608,869 B1 | | 8/2003 | Limberg | |
| 7,095,799 B2 | | 8/2006 | Braithwaite | |
| 7,392,024 B2 | | 1/2008 | Suematsu et al. | |
| 8,213,541 B2 | * | 7/2012 | Nakao | H04L 27/2657 375/316 |
| 8,570,920 B2 | * | 10/2013 | Shen | H04L 27/0002 370/297 |
| 9,036,514 B2 | * | 5/2015 | Shen | H04L 27/0002 370/297 |
| 2002/0037060 A1 | * | 3/2002 | Kishi | H04B 1/0003 375/345 |
| 2004/0036651 A1 | * | 2/2004 | Toda | H01Q 1/241 342/383 |
| 2004/0038656 A1 | * | 2/2004 | McCall | H03G 3/3052 455/138 |
| 2005/0266806 A1 | | 12/2005 | Soe et al. | |
| 2006/0068725 A1 | | 3/2006 | Zolfaghari | |
| 2007/0142009 A1 | * | 6/2007 | Scarpa | H04B 7/0868 455/132 |
| 2007/0296873 A1 | * | 12/2007 | Ironi | H04N 21/414 348/726 |
| 2010/0227570 A1 | | 9/2010 | Hendin | |

* cited by examiner

SYSTEMS AND METHODS FOR COMBINING SIGNALS FROM MULTIPLE ACTIVE WIRELESS RECEIVERS

CROSS-REFERENCE TO RELATED APPLICATIONS

The present application is a continuation of U.S. patent application Ser. No. 14/044,762, filed Oct. 2, 2013 and entitled "Systems and Methods for Combining Signals from Multiple Active Wireless Receivers," which claims the benefit of U.S. patent application Ser. No. 13/248,002, filed Sep. 28, 2011 and entitled "Systems and Methods for Combining Signals from Multiple Active Wireless Receivers," and U.S. Provisional Patent Application Ser. No. 61/388,483, filed Sep. 30, 2010 and entitled "High Dynamic Receiver and its Applications for Space Diversity," which are incorporated by reference herein.

BACKGROUND

1. Field of the Invention(s)

The present invention(s) generally relate to wireless receivers. More particularly, the invention(s) relate to systems and methods for combining signals from multiple active wireless receivers.

2. Description of Related Art

In microwave radio systems, receiver protection (backup) systems are common. In a typical receiver protection system, there is one main active receiver and one or more other secondary "backup" receivers. The secondary protection receivers are not actively receiving while the main active receiver receives signals from a wireless source (e.g., a tower or other wireless signal transmitting device). If the main active receiver fails or is operating below an acceptable limit, the main active receiver may be switched such that the main active receiver is no longer actively receiving and one of the secondary standby protection receivers become the main receiver. In the prior art, there is only one receiver actively receiving at any one time.

Space diversity configuration has not been changed in decades. FIG. 1 and FIG. 2 depict today's two most commonly used 1+1 configurations in the prior art. FIG. 1 depicts a main active receiving radio frequency unit (RFU) 102 and a secondary protection RFU 102 in the prior art. In FIG. 1, a main active receiving unit 102 in an environment 100 receives a wireless signal from a wireless communication tower 106 (e.g., cell tower or other microwave radio device) via an antenna. If the main active receiving unit 102 fails or falls below an acceptable level of performance, the main active receiving unit 102 may go into standby mode and the secondary protection receiving unit 104 may begin to actively receive, thereby receiving the signal from the wireless communication tower 106.

FIG. 2 depicts a main active receiving radio frequency unit (RFU) 202 and a secondary protection RFU 204 when an RFU enclosure is optimized for protection in the prior art. In an environment 200, a main active receiving unit 202 and a secondary protection receiving unit 204 receive the signal from one antenna (i.e., wireless communication tower 206). For example, an antenna receives a wireless signal from the wireless communication tower 106 and provides the signal to a filter and/or diplexer. The filter and/or diplexer provide the signal to the main active receiving radio frequency unit 202. A coupler provides the signal to the secondary protection receiving radio frequency unit 204 as well, however, like the protection receiving unit in FIG. 1, the secondary protection receiving radio frequency unit 204 is typically not actively receiving. If the main active receiving unit 202 fails or falls below an acceptable level of performance, the main active receiving unit 202 may go into standby mode (i.e., the main active receiving unit 202 may stop actively receiving) and the secondary protection receiving unit 204 may actively receive. As a result, the secondary protection receiving unit 204 may receive the signal from the wireless communication tower 106.

In both configurations of FIGS. 1 and 2, two receivers are on all the time, however, the systems may decide to use either the main active receiving unit or the secondary protection receiving unit. The determination to switch to a receiving radio frequency unit may be based on a quality alarm of each channel such as slope alarm, equalization alarm, or RSL (receiver signal level) low alarm. In legacy implementations, this decision may occur in real time either on a bit-by-bit or data block by data block basis.

Unfortunately, when the system switches receivers, performance suffers (e.g., the system may no longer be hitless). Today's 1+1 architecture only achieves hitless switching protection during multi-path fading conditions. Further, other failure mechanisms, including equipment failure, generally affect the performance (e.g. the system is not hitless)."

SUMMARY OF THE INVENTION

Systems and methods for combining signals from multiple active wireless receivers are discussed herein. An exemplary system comprises a first downconverter, a phase comparator, a phase adjuster, and a second downconverter. The first downconverter may be configured to downconvert a received signal from a first antenna to an intermediate frequency to create an intermediate frequency signal. The phase comparator may be configured to mix the received signal and a downconverted signal to create a mixed signal, compare a phase of the mixed signal to a predetermined phase, and generate a phase control signal based on the comparison, the downconverted signal being associated with the received signal from the first antenna. The phase adjuster may be configured to alter the phase of the intermediate frequency signal based on the phase control signal. The second downconverter may be configured to downconvert the phase-shifted intermediate frequency signal to create an output signal.

The downconverted signal may comprise the intermediate frequency signal. The received signal may be received from a diplexer which is coupled to the first antenna. Further, the received signal may be filtered with a low noise amplifier after being provided from the diplexer.

In some embodiments, the first downconverter is configured to mix a filtered oscillator signal with the received signal to create the intermediate frequency signal. The system may further comprise comprising comparing a gain to a predetermined gain value and adjusting the gain of the downconverted phase-shifted intermediate frequency signal based on the comparison.

In various embodiments, the system of claim 1, further comprises a second radio frequency unit configured to receive the received signal from a second antenna, the second radio frequency unit configured to alter a phase of the received signal from the second antenna to a phase that is substantially similar to the altered phase of the intermediate frequency signal of the first radio frequency unit. The second radio frequency unit may be configured to adjust a gain of an output signal, the gain of the output signal of the second radio frequency unit being substantially similar to the gain of the output signal of the first radio frequency unit. The system may further comprise a signal combiner configured to combine the output signal from the first radio frequency unit and the output signal from the second radio frequency unit. Moreover, the system may further comprise a postdistortion module configured to add distortion to the output signal and a demodulator configured to receive the output signal from the postdistortion module and provide in-phase (I) and quadrature (Q) signals.

The system may also further comprise a waveguide configured to receive the received signal from the first antenna and provide the received signal to the first downconverter. In various embodiments, the first antenna is part of a point-to-point microwave communication system.

An exemplary system may comprise a first receiving radio frequency unit, a second receiving radio frequency unit, and a signal combiner. The first receiving radio frequency unit may be configured to compare a phase of a received signal from a first antenna to a predetermined phase value, and to adjust the phase of the received signal from the first antenna to generate a first phase-adjusted signal. The second receiving radio frequency unit may be configured to compare a phase of a received signal from a second antenna to the predetermined phase value, and to adjust the phase of the received signal from the second antenna to generate a second phase-adjusted signal. The signal combiner may be configured to combine the first and second phase-adjusted signals, the phase of the first and second phase-adjusted signals being substantially similar.

An exemplary method comprises comparing, by a first receiving radio frequency unit, a phase of a received signal from a first antenna to a predetermined phase value, adjusting, by the first receiving radio frequency unit, the phase of the received signal from the first antenna to generate a first phase-adjusted signal, comparing, by a second receiving radio frequency unit, a phase of a received signal from a second antenna to the predetermined phase value, adjusting, by the second receiving radio frequency unit the phase of the received signal from the second antenna to generate a second phase-adjusted signal, and combining the first and second phase-adjusted signals, the phase of the first and second phase-adjusted signals being substantially similar.

DETAILED DESCRIPTION OF THE INVENTION

In today's spatial diversity configuration, signal combining techniques are not used because of the unknown characteristics of each receiver. In various embodiments, a signal combining technique for radio receivers is discussed. As a result, instead of allowing one receiver to remain in a standby mode, two or more active receivers may be configured to receive signals, and to adjust the phase and gain of each signal to match the other (thereby overcoming unknown characteristics of each receiver). The signals from the two receivers may then be combined.

Since multiple receivers are used with a signal combining technique, information may be retrieved from a wireless signal with increased accuracy and greater dynamic range. Further, equipment and power are essentially inoperative "standby mode." Moreover, in at least some of the embodiments discussed herein, hitless protection may be achieved. For example, if one of the receivers fails, the other receiver may continue to act as an active receiver without a lapse in performance. As a result, time is not lost switching from a failed receiver to a standby receiver.

Figure 1:
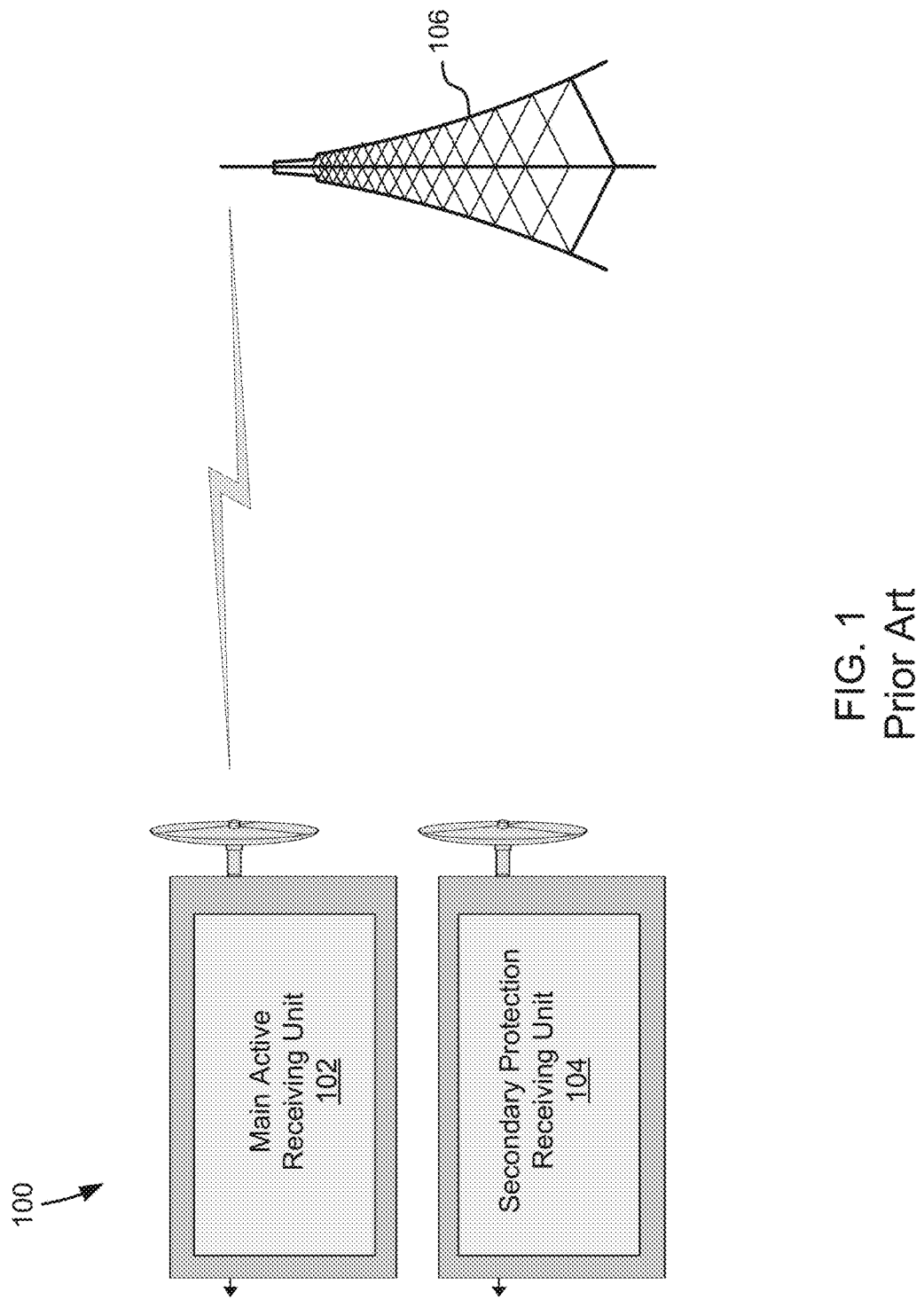
FIG. 1 depicts a main active receiving radio frequency unit (RFU) and a secondary protection RFU in the prior art.
Figure 2:
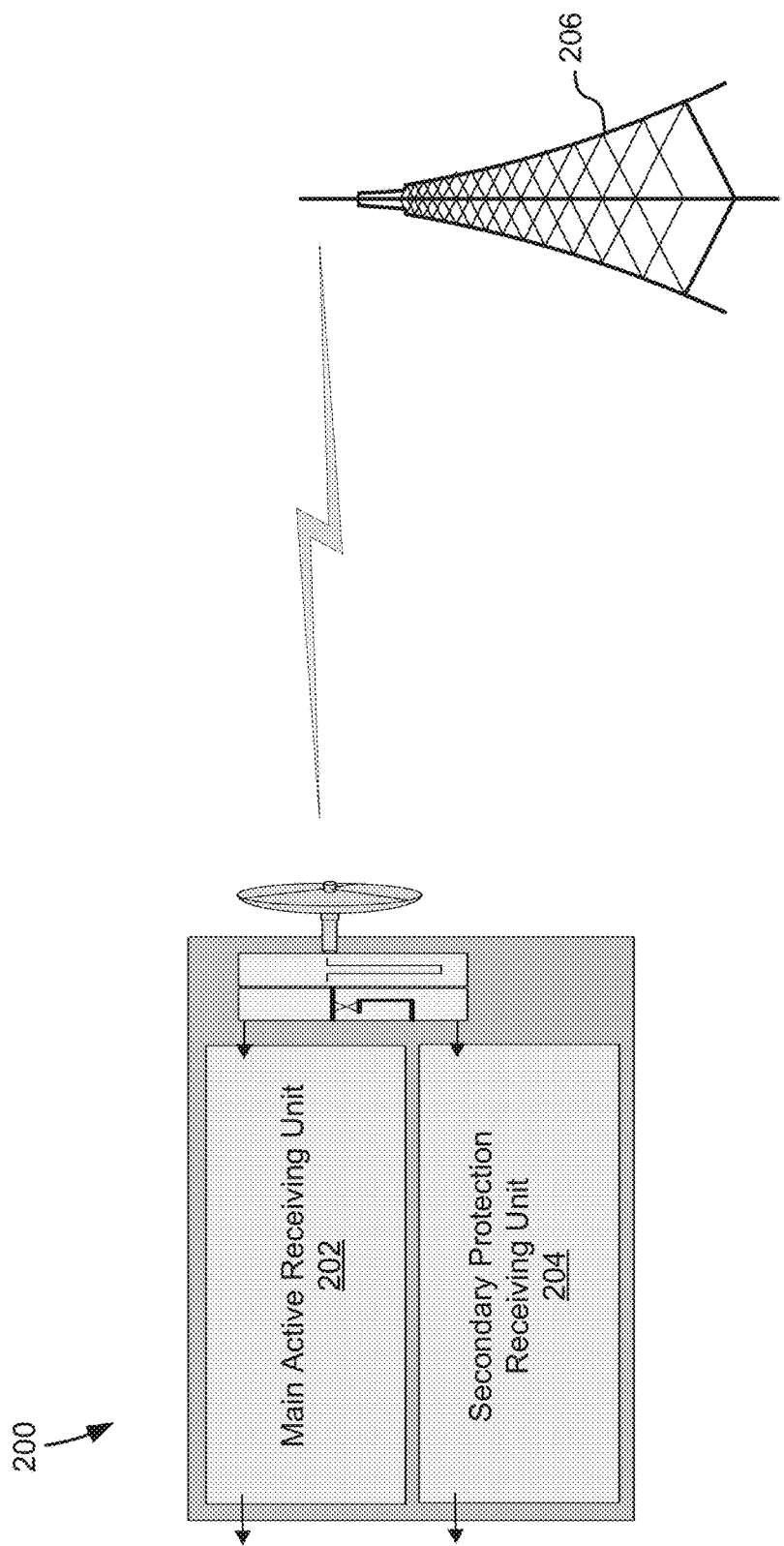
FIG. 2 depicts a main active receiving radio frequency unit (RFU) and a secondary protection RFU when an RFU enclosure is optimized for protection in the prior art.
Figure 3:
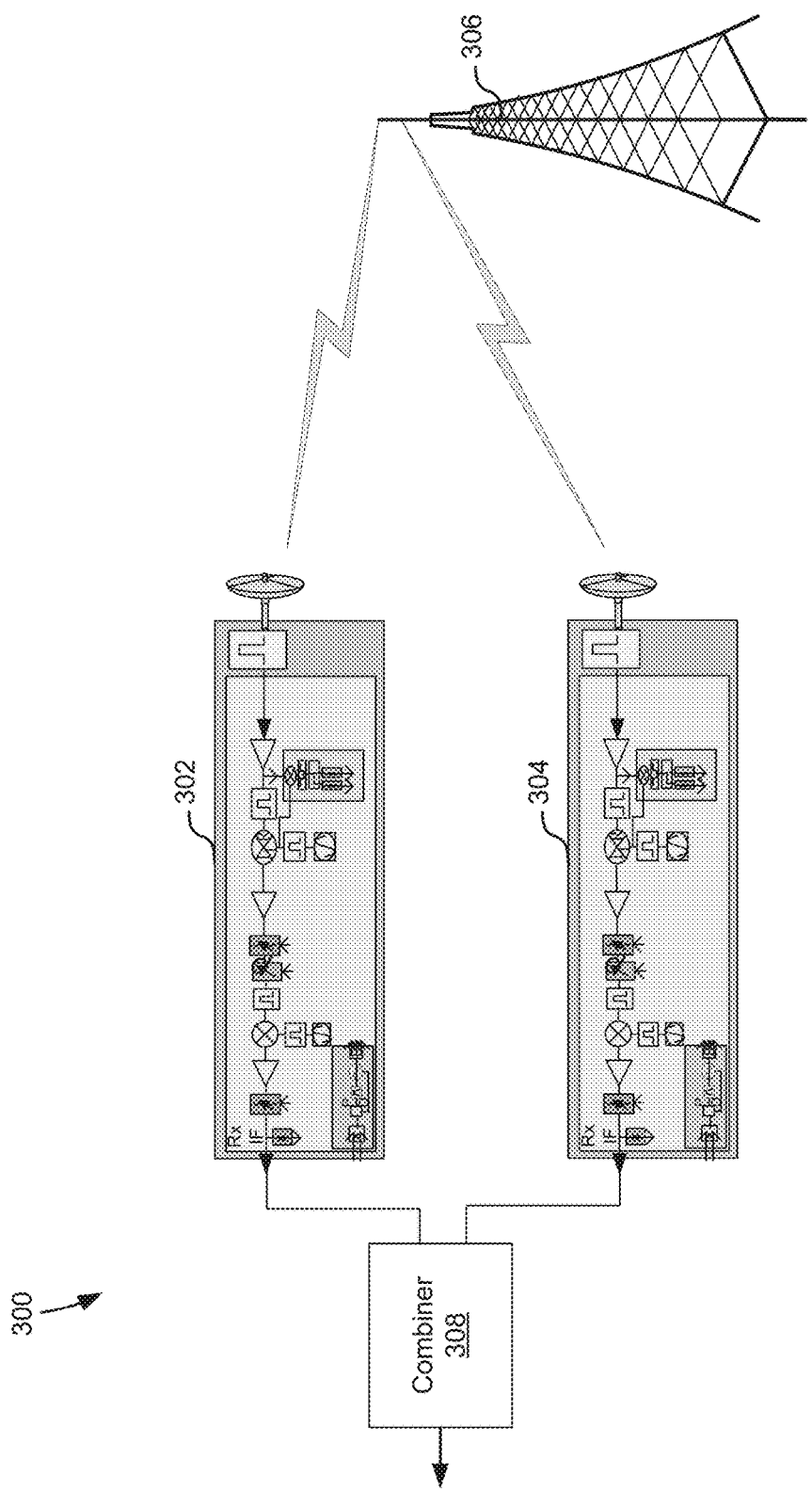
FIG. 3 is a block diagram of exemplary receiving radio frequency units and configured to both actively receive a signal from a wireless communication source (e.g., a cell tower) in some embodiments.

FIG. 3 is a block diagram 300 of exemplary receiving radio frequency units 302 and 304 configured to both actively receive a signal from a wireless communication source 306 (e.g., a cell tower) in some embodiments. In various embodiments, the receiving radio frequency units 302 and 304 are part of a microwave communication system.

Both the receiving radio frequency units 302 and 304 may be active (i.e., there is no receiving unit that is in standby mode). In one example, both the receiving radio frequency units 302 and 304 receive the same signal from the wireless communication source 306, process the signal independently of each other, and then provide the signals to a combiner 308. The combiner 308 combines the signals from the receiving radio frequency units to provide single signal with greater accuracy and increased dynamic range for potentially further processing and/or communication. The combiner 308 may be a signal combiner.

The signal received by both the receiving radio frequency units 302 and 304 may contain the same information. In some embodiments, the signals are part of a single transmission from the wireless communication source (e.g., a broadcast). In various embodiments, the signals are provided in a point-to-point system whereby the wireless communication source 306 directly provides the signal to the receiving radio frequency unit 302 and the receiving radio frequency unit 304.

Each receiving radio frequency unit 302 and 304 may adjust the phase and gain of the received signal to a predetermined phase and gain, respectively. As a result, the phase and gain of the signal provided from the receiving radio frequency unit 302 may be the same phase and gain as the signal provided from the receiving radio frequency unit 304. Subsequently, the combiner 308 may combine the signals from the receiving radio frequency units 302 and 304 thereby strengthening the signal.

Each receiving radio frequency unit 302 or 304 may be a part of a microwave communication system whereby each of the receiving radio frequency unit 302 and 304 comprise a waveguide, waveguide filter, and diplexer. In some embodiments, each receiving radio frequency unit 302 and 304 receive the signal from the wireless communication source 306, propagate the electromagnetic wave energy through a waveguide, and/or filter the electromagnetic wave energy with a waveguide filter prior to passing the signal through the diplexer.

Although FIG. 3 depicts two receiving radio frequency units, on wireless communication source, and one combiner, those skilled in the art will appreciate that there may be any number of receiving radio frequency units, antennas, diplexers, wireless communication sources and/or combiners.

Figure 4:
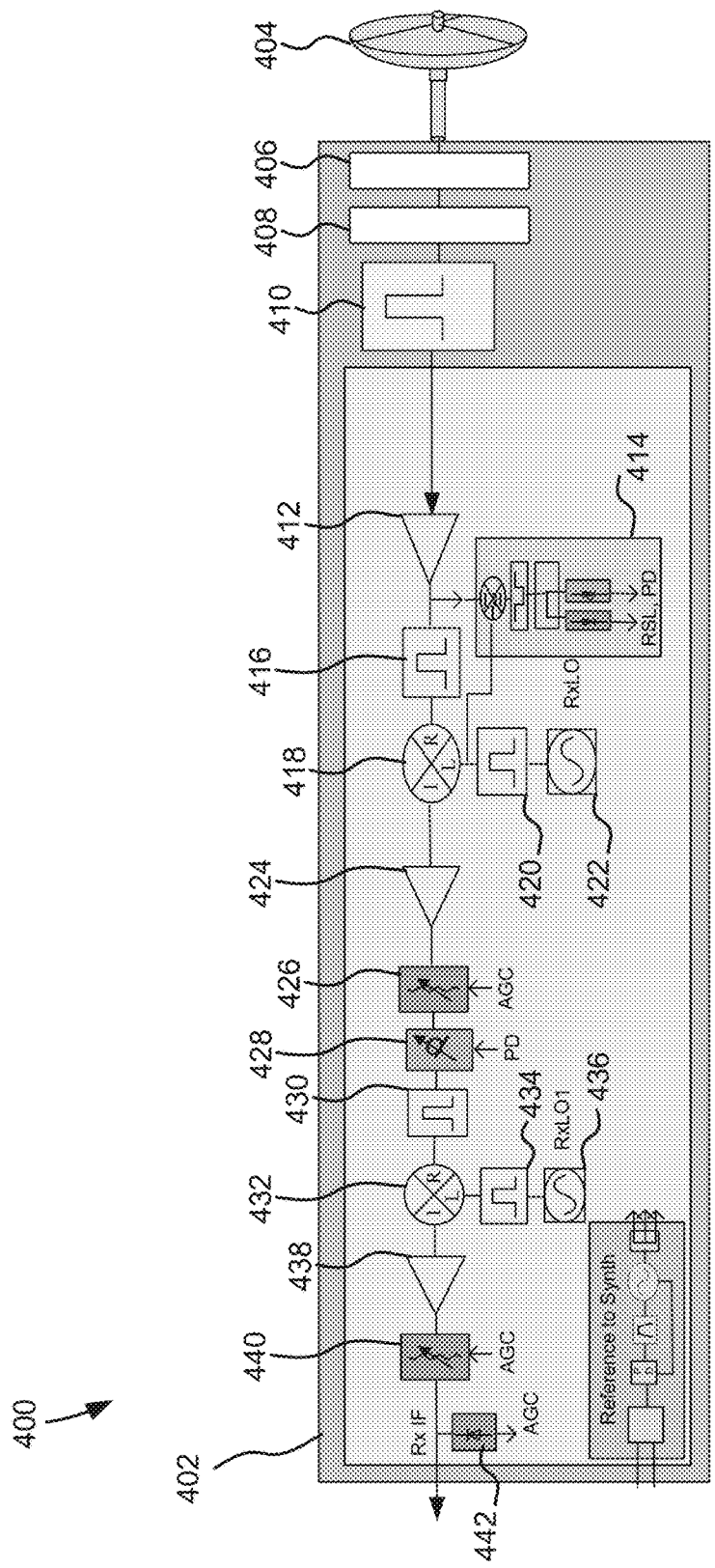
FIG. 4 is a block diagram of an exemplary receiving radio frequency unit in some embodiments.

FIG. 4 is a block diagram 400 of an exemplary receiving radio frequency unit 402 in some embodiments. In one example, the receiving radio frequency unit 402 may be either the receiving radio frequency unit 302 or the receiving radio frequency unit 304 described in FIG. 3.

Block diagram 400 comprises an antenna 404 and a diplexer 410 coupled to the waveguide 406. The waveguide 406 may provide the signal from the antenna 404 to the diplexer 410 via a waveguide filter 408. The diplexer 410 may provide the signal to the receiving radio frequency unit 402. In some embodiments, the receiving radio frequency unit 402 may comprise the waveguide 406, the waveguide filter 408, and/or the diplexer 410.

The waveguide 406 may be any waveguide kind or type of waveguide. For example, the waveguide 406 may be hollow or dielectric. In some embodiments, the waveguide 406 comprises a rectangular to circular waveguide. The waveguide filter 408 may be any filter coupled to the waveguide 406 and configured to filter the electromagnetic waves from the waveguide 406 (e.g., remove noise).

In various embodiments, the receiving radio frequency unit 402 is configured to receive a signal from the antenna 404 via the diplexer 406 and adjust the phase of the received signal. The phase of the received signal may be adjusted based on a comparison of the phase of the signal and a predetermined phase value. In some embodiments, the receiving radio frequency unit 402 may also be configured to adjust the gain of the received signal. In one example, the receiving radio frequency unit 402 may adjust the gain of the received signal based on a comparison of a gain of the received signal with a predetermined gain value.

The receiving radio frequency unit 402 may be any receiver including, but not limited to, a traditional heterodyne receiver with RX intermediate frequency (IF) output. Those skilled in the art will appreciate that multiple receiving radio frequency units may be used to receive the same signal (e.g., signals containing the same information provided by a wireless communication source). Each receiving radio frequency unit may adjust the phase of the received signal, respectively, based on the same predetermined phase value. Similarly, each receiving radio frequency unit may adjust the gain of the received signal, respectively, based on the same gain value. As a result, the phase and gain of the signal from each receiving radio frequency unit may be the same or substantially similar (e.g., the phase and gain of the signals may be identical). The signals may be subsequently combined to strengthen the signal, increase dynamic range, and/or more accurately reproduce the information that was wirelessly transmitted.

The receiving radio frequency unit 402 may comprise amplification/attenuation modules 412, 424, and 438, filter modules 416, 420, 430, and 434, mixer modules 418 and 432, oscillator modules 418 and 432, phase control module 414, automatic gain control modules 426, 440, and 442, and variable phase module 428.

The amplification/attenuation modules 412, 424, and 438 may comprise an amplifier and/or an attenuator configured to amplify and/or attenuate a signal. The amplification/attenuator modules 412, 424, and 438 may be any kind of amplifiers and/or attenuators. Further, the amplification/attenuator modules 412, 424, and 438 may each comprise amplifiers and/or attenuators with any kind of electrical properties.

In some embodiments, the amplifier/attenuator module 412 receives a signal via the antenna 404 and the diplexer 406. The amplifier/attenuator module 108 may be a low noise amplifier configured to amplify the signal (or components of the signal) before providing the signal to the filter module 416 and the phase control module 414. Further, the amplifier/attenuator module 424 may attenuate the signal (or components of the signal) after the signal has been downconverted by the mixer module 418, the filter module 420, and the oscillator module 422. The amplifier/attenuator module 424 may then provide the signal to the automatic gain control 426. The amplification/attenuator module 438 may attenuate the signal (or components of the signal) after the signal has been downconverted by the mixer 432, the filter module 434, and the oscillator module 436. The amplifier/attenuator module 438 may then provide the signal to the automatic gain control 440.

Those skilled in the art will appreciate that each of the amplifier/attenuator modules 412, 424, and 438 may be the same as one or more other amplifier/attenuator modules. For example, amplifier/attenuator modules 412 and 424 may both be amplifiers sharing the same electrical properties while amplifier/attenuator module 438 may be an attenuator. In another example, amplifier/attenuator modules 412 and 424 may both be amplifiers but have different electrical properties.

Each amplifier/attenuator module 412, 424, and 438 may include one or more components. For example, the amplifier/attenuator module 412 may comprise one or more amplifiers and/or attenuators.

The filter modules 416, 420, 430, and 434 may comprise filters configured to filter the signal. The filter modules 416, 420, 430, and 434 may comprise many different types of filters (e.g., bandpass filter, low pass filter, high pass filter, or the like) with many different electrical properties. In one example, the filter module 416 may be a band pass filter configured to filter the signal (or components of the signal) received from the amplification/attenuation module 412 before providing the signal to the mixer module 418. Similarly, filter modules 420, 430, and 434 may filter signals (or components of the signals) from the oscillator module 422, the phase adjuster 428, and the oscillator module 436, respectively.

Those skilled in the art will appreciate that each of the filter modules 416, 420, 430, and 434 may be the same as one or more other filter modules. For example, filters module 416 and 420 may both be filters sharing the same electrical properties while filter module 430 may be another kind of filter. In another example, filters module 416 and 420 may both be filters of a similar type but have different electrical properties.

Each filter modules 416, 420, 430, and 434 may include one or more components. For example, the filter modules 416 may comprise one or more filters.

The mixer modules 418 and 432 may comprise mixers configured to mix the signal received from the antenna with one or more other signals. The mixer modules 418 and 432 may comprise many different types of mixers with many different electrical properties. In one example, the mixer 418 mixes a signal received from the filter module 416 with the filtered oscillating signal from the filter module 420 and the oscillator module 422. In another example, the mixer module 432 mixes a signal received from the filter module 430 with the filtered oscillating signal from the filter module 434 and the oscillator module 436.

Those skilled in the art will appreciate that each of the mixer modules 418 and 432 may be the same as one or more other mixer modules. For example, mixer modules 418 and 432 may both be mixers sharing the same electrical properties or, alternately, the mixer modules 418 and 432 may be another kind of mixer and/or with different electrical properties.

Each mixer modules 418 and 432 may include one or more components. For example, the mixer module 418 may comprise one or more mixers.

The oscillator modules 422 and 436 may comprise oscillators configured to provide an oscillating signal that may be used to downconvert the signal received from the antenna with one or more other signals. The oscillator modules 422 and 436 may comprise any kind of oscillator with any different electrical properties. In one example, the oscillator module 422 provides an oscillating signal to the filter module 420. The oscillator module 434 may provide an oscillating signal to the filter module 436.

The oscillating modules 422 and 436, either individually or together, may be local or remote. In one example, the oscillating module 422 and/or the oscillating module 436 may be remotely located and configured to provide an oscillating signal to one or more receiving radio frequency units. In some embodiments, a single oscillating module may provide an oscillating signal to both the mixer module 418 and 432, respectively (e.g., optionally via a filter). In one example, the local oscillator signal from the oscillator module may be altered (e.g., oscillation increased or decreased) and provided to a different part of the circuit.

Those skilled in the art will appreciate that each of the oscillator modules 422 and 436 may be the same as each other. For example, oscillator modules 422 and 436 may both be oscillators sharing the same electrical properties or, alternately, the oscillator modules 422 and 436 may be another kind of oscillator and/or with different electrical properties.

Each oscillator modules 422 and 436 may include one or more components. For example, the oscillator module 422 may comprise one or more oscillators.

The phase control module 414 may be configured to generate a phase control signal to control the phase of a processed signal. In one example, the phase control module 414 receives the filtered signal from the amplifier/attenuator module 412 and mixes the amplified or attenuated signal with the filtered local oscillator or the downconverted signal from the first downconverter (e.g., mixer module 418, filter module 420, and oscillator module 422). The phase control module 414 may filter and compare the filtered, mixed signal with a predetermined phase value to generate a phase control signal based on the comparison. By mixing the oscillator signal with the sampled signal from the coupler prior to determining the phase of the signal, the frequency of the signal is reduced and lower priced components may be used in the phase control module 414.

In some embodiments, the phase control module 418 uses a coupling port in the same path as RSL. The coupling port may sample the signal. In some embodiments, the coupling port comprises a capacitive tap. In some embodiments, a preexisting transmitter may be modified to take advantage of one or more systems and methods described herein. In one example, the mixer and filter of the phase control module 418 is a part of the RSL functionality. A splitter may be used to split the signal between the RSL and a phase comparator (discussed herein). The phase comparator may generate the phase control signal based on a comparison of the phase of the signal from the mixer and a predetermined phase value.

In various embodiments, the coupling port for both input amplitude and phase can be coupled before the Rx LNA (e.g., low noise amplifier 412), after LNA 412, or after the 1st down-conversion (e.g., via the mixer module 418, filter module 420, and the oscillator module 422), depending on, for example, requirements of cost and accuracy.

The phase control module 414 may comprise a variety of different components (e.g., a mixer, filter, splitter, and a comparison module). The phase control module 418 is further described with regard to FIG. 8 herein. In various embodiments, one phase control module 414 may receive signals from a plurality of different receiving radio frequency units and provide phase control signals to one or more of the different receiving radio frequency units.

The automatic gain control modules 426, 440, and 442 may comprise automatic gain control (AGC) circuits configured to increase or decrease the gain of the signal received from the antenna 404 with one or more other signals. The automatic gain control modules 426, 440, and 442 may comprise many different types of AGCs with many different electrical properties. In one example, the automatic gain control module 426 increases or decreases the gain of the signal received from the amplifier/attenuator module 424. The automatic gain control module 426 may adjust the gain of the signal based on a gain control signal. Similarly, the automatic gain control module 440 increases or decreases the gain of the signal received from the amplifier/attenuator module 438. In some embodiments, the automatic gain control module 440 may increase or decrease the gain of the signal based on a gain control signal. The automatic gain control module 442 may also increase or decrease the gain of the signal received from the automatic gain control module 440 and/or generate the gain control signal. In some embodiments, the automatic gain control module 442 may compare the amplification of the signal from the automatic gain control module 440 to a predetermined gain value and generate the gain control signal based on the comparison. The gain control signal may control the automatic gain control module 426 and/or the automatic gain control module 440.

Those skilled in the art will appreciate that each of the automatic gain control modules 426, 440, and 442 may be the same as one or more other automatic gain control modules. For example, automatic gain control modules 426 and 440 may both be AGCs sharing the same electrical properties or, alternately, the automatic gain control modules 426 and 440 may be another kind of AGC and/or with different electrical properties.

Each automatic gain control modules 426, 440, and 442 may include one or more components. For example, the automatic gain control module 426 may comprise one or more AGCs.

The phase adjuster 428 may comprise a variable phase control circuit configured to increase or decrease the phase of the signal received from the antenna 404. The phase adjuster 428 may comprise any different type of phase adjuster with different electrical properties. In one example, the phase adjuster 428 increases or decreases the phase of the signal received from the automatic gain control module 426. The phase adjuster 428 may adjust the phase of the signal based on a phase control signal from the phase control module 414.

The phase adjuster 428 may include one or more components. For example, the phase adjuster 428 may comprise one or more phase control elements.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

Figure 5:
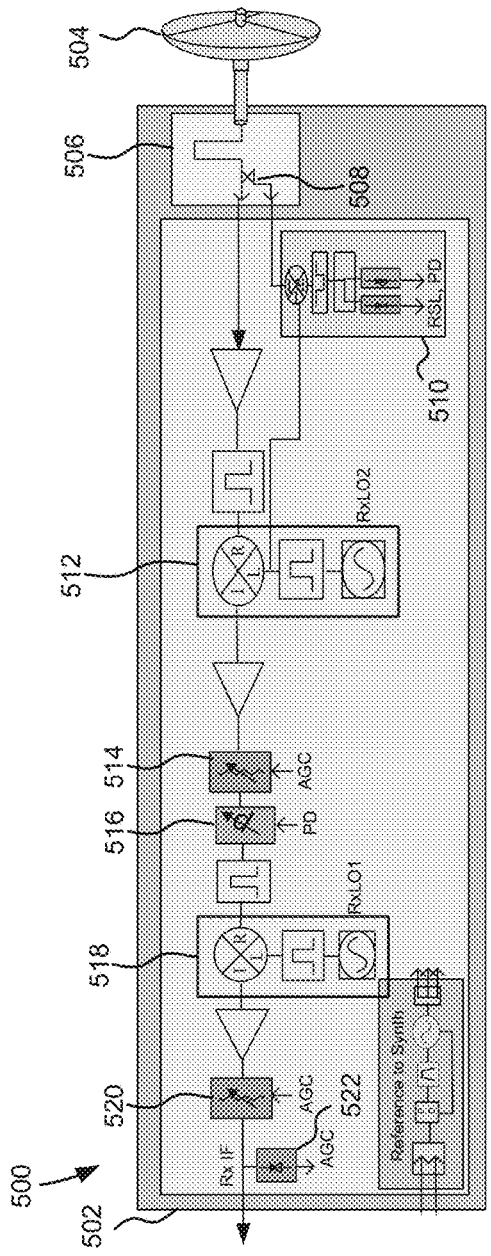
FIG. 5 depicts a circuit diagram illustrating an exemplary receiving radio frequency unit with a phase control module coupled to a coupler near the diplexer and a first downconverter module in some embodiments.

FIG. 5 depicts a circuit diagram 500 illustrating an exemplary receiving radio frequency unit 502 with a phase control module 510 coupled to a coupler 508 near the diplexer 506 and a first downconverter module 512 in some embodiments. The receiving radio frequency unit 502 may be coupled to an antenna 504. In some embodiments, the receiving radio frequency unit 502 comprises components similar to receiving radio frequency unit 402 described with regard to FIG. 4.

For example, the receiving radio frequency unit 502 may comprise a diplexer 506, coupler 508, a phase control module 510, a first downconverter module 512, an AGC module 514, a phase adjuster 516, a second downconverter module 518, an AGC module 520, and an AGC module 522. The receiving radio frequency unit 502 may also comprise additional components (e.g., as shown in FIG. 5 and discussed with regard to FIG. 4).

A signal may be received by a diplexer 506 via the antenna 504. A coupler 508 may provide the signal to the phase control module 510. The phase control module 510 may function in a manner as similar phase control module 414 described with regard to FIG. 4. In one example, the phase control module 510 may mix the signal from the coupler 508 with the filtered oscillator signal of the oscillator module of the first downconverter module 512. The phase control module 510 may filter and/or compare a phase of the mixed signal with a predetermined phase value to create a phase control signal which controls the phase adjuster 516.

The downconverter module 512 may downconvert the signal received from the diplexer 506. In some embodiments, the signal is filtered, attenuated or amplified (e.g., via a low noise amplifier) prior to downconversion. The downconverter module 512 may comprise an oscillator module that provides a signal to a filter and is subsequently mixed with the signal received from the antenna 504 to downconvert the signal.

The signal may be filtered and the gain adjusted by the AGC module 514. The phase of the signal may be altered by the phase adjuster 516 based on the phase control signal from the phase control module 510. The signal may then be filtered and downconverted by the second downconvert module 518. Like the downconvert module 512, the downconvert module 518 may comprise an oscillator module that provides a signal to a filter and is subsequently mixed with the signal received from the antenna 504 to downconvert the signal. The output of the downconvert module 518 may be an output signal.

The AGC module 520 may adjust the gain of the signal after attenuating or amplifying the signal from the downconverter module 518. The AGC module 514 and/or the AGC module 520 may adjust the gain of the filter based on a gain control signal.

In some embodiments, the AGC module 522 may compare the gain of the signal to a predetermined gain value and control the AGC module 514 and/or the AGC module 520 to increase or decrease the gain of the signal.

Figure 6:
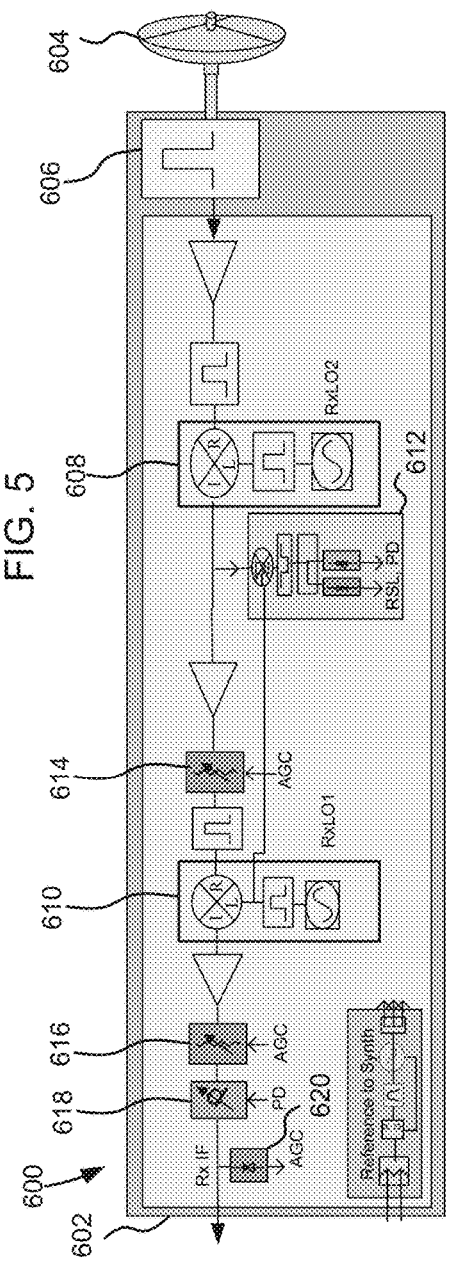
FIG. 6 depicts a circuit diagram illustrating an exemplary receiving radio frequency unit with a phase control module coupled to a first downconverter module and a second downconverter module in some embodiments.

FIG. 6 depicts a circuit diagram illustrating an exemplary receiving radio frequency unit 602 with a phase control module 612 coupled to a first downconverter module 608 and a second downconverter module 610 in some embodiments. The receiving radio frequency unit 602 may be coupled to an antenna 604 via the diplexer 606. In some embodiments, the receiving radio frequency unit 602 comprises components similar to receiving radio frequency unit 402 described with regard to FIG. 4.

For example, the receiving radio frequency unit 602 may comprise a first downconverter module 608, a second downconverter module 610, a phase control module 612, an AGC module 614, an AGC module 616, a phase adjuster 618, and an AGC module 620. Unlike the phase control module 502 (discussed with regard to FIG. 5) which mixes a signal from a coupler with the oscillator signal from the first downconverter module 512, the phase control module 612 mixes a filtered oscillator signal from the first downconverter module 608 with the a filtered oscillator signal from the second downconverter module 610. The phase control module 612 filters the mixed signal, and compares the phase of the filtered mixed signal with a predetermined phase value to generate the phase control signal. The phase control signal may control the phase adjuster 618 to adjust the phase of the signal.

The receiving radio frequency unit 602 may also comprise the AGC module 620 which may be configured to compare the gain of the signal to a predetermined gain value to generate a gain control signal. The gain control signal may control the AGC module 614 and/or the AGC module 616 to increase or decrease the gain of the signal.

Those skilled in the art will appreciate that, like the receiving radio frequency unit 402 discussed with regard to FIG. 4, the receiving radio frequency unit 502 and the receiving radio frequency unit 602 may comprise a waveguide and/or a waveguide filter. The waveguide and/or waveguide filter may operate in a manner as discussed with regard to FIG. 4.

Further, those skilled in the art will appreciate that the receiving radio frequency units of FIGS. 4-6 may provide signals to a signal combiner. The signal combiner may combine the signals of two or more receiving radio frequency units.

Figure 7:
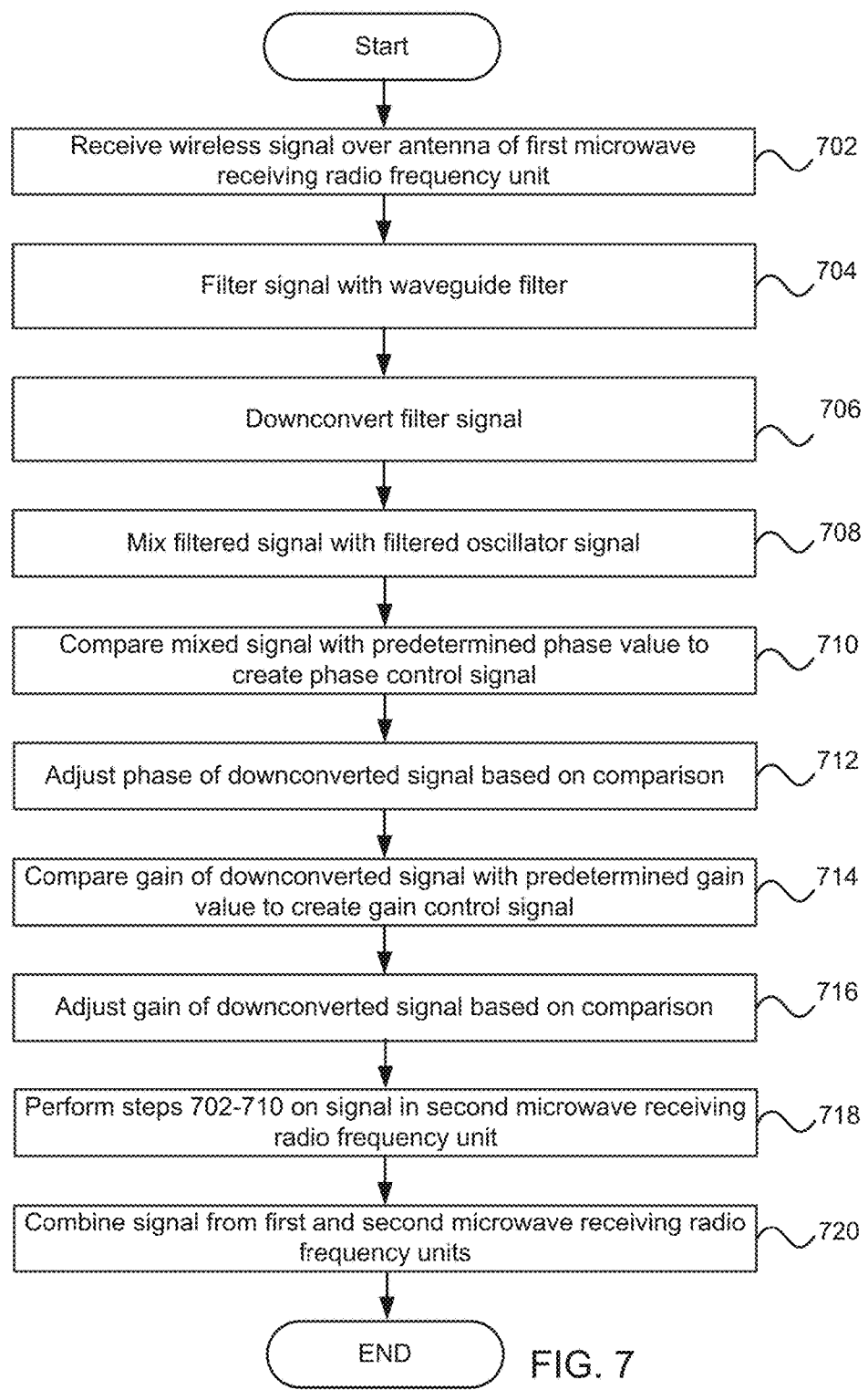
FIG. 7 is a flow chart of an exemplary method for combining signals, with similar gain and phase, from different exemplary microwave receiving radio frequency units.

FIG. 7 is a flow chart of an exemplary method for combining signals, with similar gain and phase, from different exemplary microwave receiving radio frequency units. In step 702, an antenna 404 receives a wireless signal and provides the signal to the receiving radio frequency unit 402. In some embodiments, the electromagnetic wave energy of the wireless signal propagates through a waveguide coupled to the antenna 404 and is subsequently filtered with a waveguide filter 408 in step 704 before being provided to the receiving radio frequency unit 402 via the diplexer 410. In various embodiments, the waveguide 406, the waveguide filter 408, and/or the diplexer 410 are optional.

In step 706, the first downconverter module (e.g., the mixer module 418, the filter module 420, and/or the oscillator module 422) downconverts the signal from the diplexer 410 (received via the low noise amplifier 412). In some embodiments, the first downconverter module downconverts the signal to an intermediate frequency (IF) signal.

In step 708, the phase control module 414 mixes the signal from the antenna 404 (e.g., provided by the amplifier/attenuator module 412) with the filtered oscillator signal (e.g., filtered by filter module 420 and the oscillator module provided by the oscillator module 422) from the first downconverter module. The phase control module 414 then compares the phase of the mixed signal to a predetermined phase value in step 710. In various embodiments, the predetermined phase value is set based on the characteristics of one or more receivers and/or the signal to be adjusted.

In step 712, the phase adjuster 428 may adjust the phase of the downconverted signal (e.g., received from the AGC module 426) based on the comparison (e.g., based on a phase control signal from the phase control module 414). In some embodiments, the phase of the signal may be adjusted at any point in the circuit of receiving radio frequency unit 402.

In step 714, the AGC 442 compares the gain of the downconverted module from the second downconverter (e.g., the mixer module 432, the filter module 434, and the oscillator module 436) with a predetermined gain value to create a gain control signal. The predetermined gain value may be based on the characteristics of one or more receivers and/or the signal to be adjusted.

In step 716, the AGC module 426 adjusts the signal from the amplifier/attenuator 424 based on the gain control signal from the AGC 442. Those skilled in the art will appreciate that the gain of the signal may be adjusted at any point in the circuit of receiving radio frequency unit 402.

In step 718, steps 702-716 may be performed with a second receiving radio frequency unit. For example, a second receiving radio frequency unit may have components very similar to the first receiving radio frequency unit. The second receiving radio frequency unit may receive the signal via an antenna, propagate the signal with a waveguide and filter the signal with a waveguide filter. The second receiving radio frequency unit may comprise a phase control module configured to mix the signal from the antenna (e.g., received via a low noise amplifier 412) and a filtered, oscillator signal from the first downconverter module of the second receiving radio frequency unit. The mixed signal may be filtered and the phase of the filtered mixed signal may be compared to the predetermined phase value to generate a phase control signal to control the phase adjuster of the second receiving radio frequency unit to adjust the phase. Further, the second receiving radio frequency unit may comprise an AGC module configured to compare the gain of the signal to a predetermined gain value to generate a gain control signal based on the comparison. One or more AGC modules may adjust the gain based on the gain control signal.

In step 720, the phase and gain adjusted signal from the first receiving radio frequency unit may be combined with the phase and gain adjusted signal from the second receiving radio frequency unit. The phase and gain of both signals may be the same or substantially similar.

Figure 8:
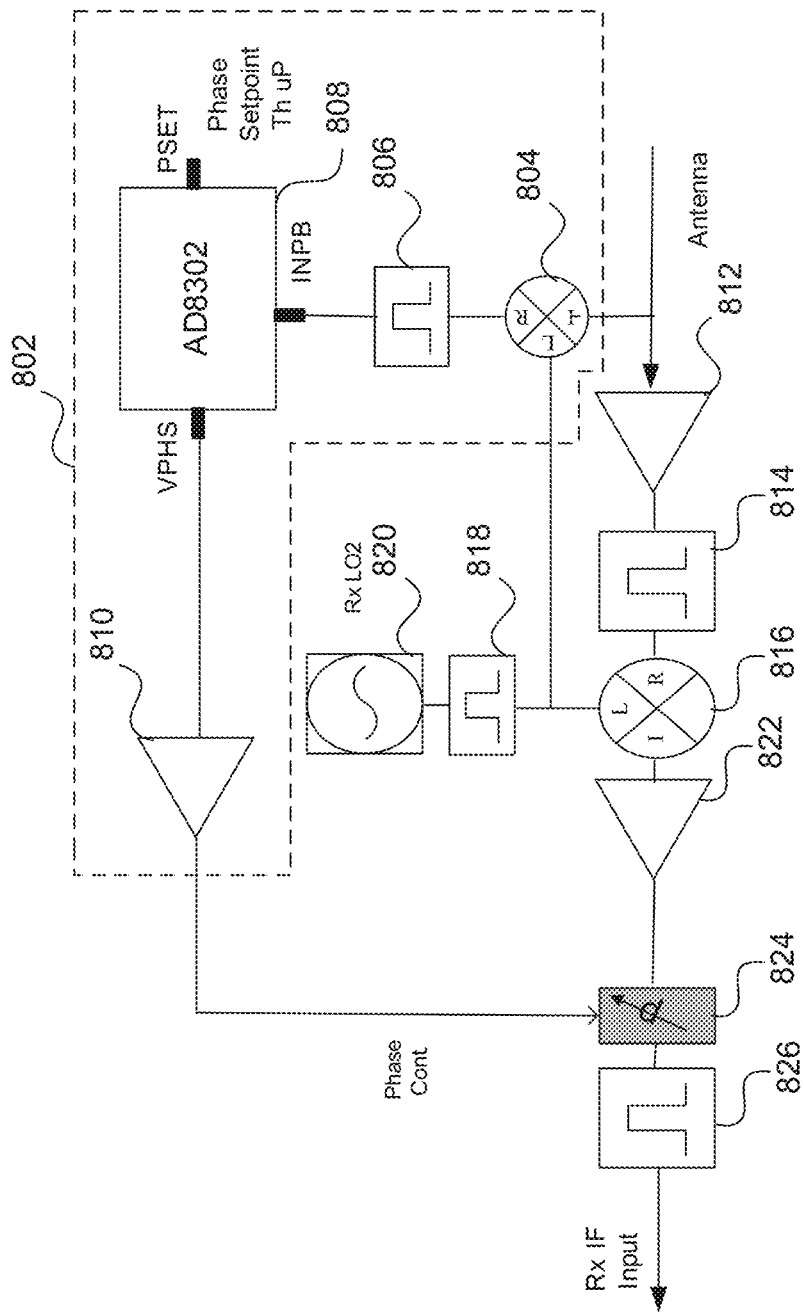
FIG. 8 is a block diagram of a phase control module in some embodiments.

FIG. 8 is a block diagram of a phase control module 802 in some embodiments. The phase control module 802 may comprise the mixer 804, the filter 806, the phase comparator 808, and the amplifier 810. The phase control module 802 may be within a receiving radio frequency unit which also comprises an amplifier/attenuator module 812, a filter module 814, a downconverter module (e.g., comprising a mixer module 816, a filter module 818, and an oscillator module 820), an amplifier/attenuator 822, a phase adjuster module 824, and a filter module 826.

In various embodiments, the mixer 804 mixes a signal from the antenna (e.g., via a diplexer, waveguide filter, waveguide, and/or an antenna) with a signal from a downconverter module. In one example, the signal is amplified with the amplifier/attenuator module 812, filtered with the filter module 814, and downconverted (e.g., by mixing the signal from the filter module 814 with the filtered oscillator signal from the oscillator module 820 and the filter 818). The downconverted signal may be an intermediate frequency signal. The mixer 804 of the phase control module 802 may receive the filtered oscillator module from the downconverter module as well as the signal from the antenna. In some embodiments, the mixer 804 may mix two filtered oscillator signals from two downconverters or may mix an amplified or attenuated signal with the oscillator signals. Those skilled in the art will appreciate that the mixer 804 may mix any two signals from any two or more points in the receiving radio frequency unit. In some embodiments, the mixer 804 is optional and the phase comparator may compare the phase of any signal from any point within the receiving radio frequency unit.

The filter module 806 filters the mixed signal from the mixer 804 and provides the signal to the phase comparator 808. The phase comparator 808 may be a chip, a processor, or a module configured to compare the phase of the signal from the filter 806 to a predetermined phase value. In one example, the phase comparator 808 may be an RF/IF detector. The phase comparator 808 generates a phase control signal based on the comparison and the filter 810 filters the phase control signal before providing the phase control signal to the phase adjuster 824.

Based on the phase control signal, the phase adjuster 824 may adjust the downconverted signal from the downconverter module via the amplifier/attenuator module 822. The phase adjusted signal is subsequently filtered by the filter module 826.

The predetermined phase value and/or the predetermined gain value may be set in any number of ways. In various embodiments, a user may set the predetermined phase value and/or the predetermined gain value within a chip. In one example, the predetermined phase value may be set within the phase comparator 808. In some embodiments, a pilot signal is sent to one or more receiving radio frequency units. The phase comparator 808 may set the predetermined phase value and/or the predetermined gain value based on the pilot signal.

In various embodiments, one receiving radio frequency unit may receive the predetermined phase value and/or the predetermined gain value from another receiving radio frequency unit. For example, a first receiving radio frequency unit may request the predetermined phase value and/or the predetermined gain value from a digital device and/or another receiving radio frequency unit. The digital device or receiving radio frequency unit may provide the predetermined phase value and/or the predetermined gain value to the requesting receiving radio frequency unit. In some embodiments, an receiving radio frequency unit provides the predetermined phase value and/or the predetermined gain value to one or more other predetermined phase value (e.g., when the receiving radio frequency unit changes, at predetermined intervals, or upon request by a user).

Those skilled in the art will appreciate that the gain of the signal may be similarly adjusted. For example, the gain of the signal may be compared to a predetermined gain value to generate a gain control signal. An AGC may be controlled with the gain control signal to increase or decrease the gain of the signal.

The gain and/or the phase of a signal may be adjusted at any point within the receiving radio frequency unit. Further, the gain and/or the phase of the signal may be adjusted any number of time. In one example, the phase of the signal is adjusted multiple times based on the same phase control signal. In another example, the phase of the signal is compared multiple times to one or more predetermined phase values and adjusted based on the comparison.

Figure 9:
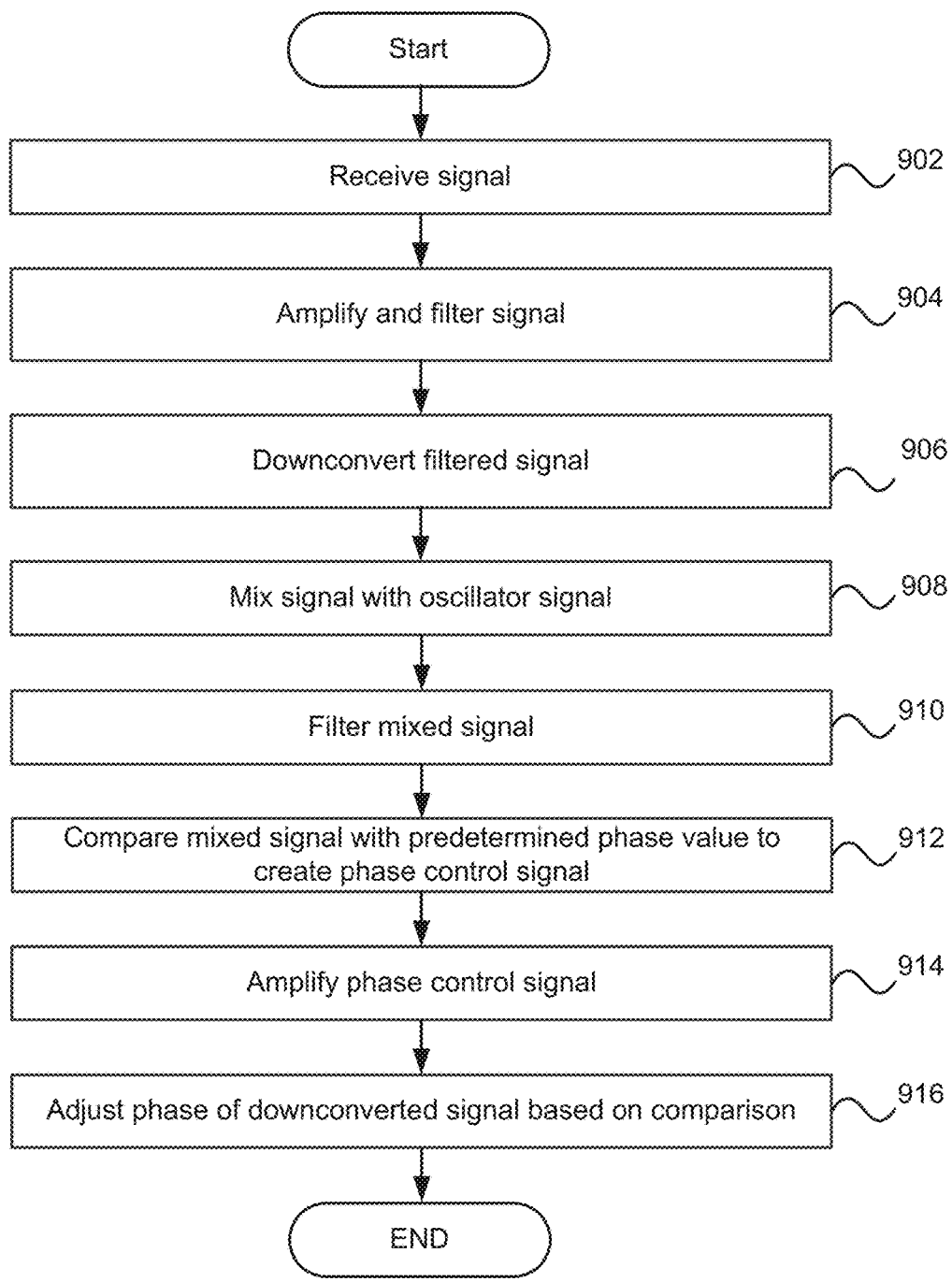
FIG. 9 is a flow chart of an exemplary method for controlling a phase of a signal in an exemplary microwave receiving radio frequency unit.

FIG. 9 is a flow chart of an exemplary method for controlling a phase of a signal in an exemplary microwave receiving radio frequency unit. In step 902, a signal is received by the receiving radio frequency unit. In step 904, the signal is amplified by the amplifier/attenuator module 812 and filtered by the filter module 814. In step 906, the downconverter module downconverts the signal to form an IF signal (e.g., using the oscillator module 820, the filter module 818, and the mixer module 816).

In step 908, the mixer 804 of the phase control module 802 mixes the signal from the antenna (e.g., received via any number of components between the phase control module 802 and the antenna) with the oscillator signal from the downconverter module. In step 910, the optional filter module 806 filters the mixed signal from the mixer 804.

In step 912, the phase comparator compares the phase of the mixed signal with a predetermined phase value to create or generate the phase control signal. The phase control signal may be amplified or attenuated with the amplifier/attenuator module 810 in step 914.

In step 916, the phase control signal controls the phase adjuster 824 which adjusts the phase of the signal received from the amplifier/attenuator module 822. As a result, the phase adjuster 824 adjusts the phase of the signal based on the comparison of the phase comparator 808.

Figure 10:
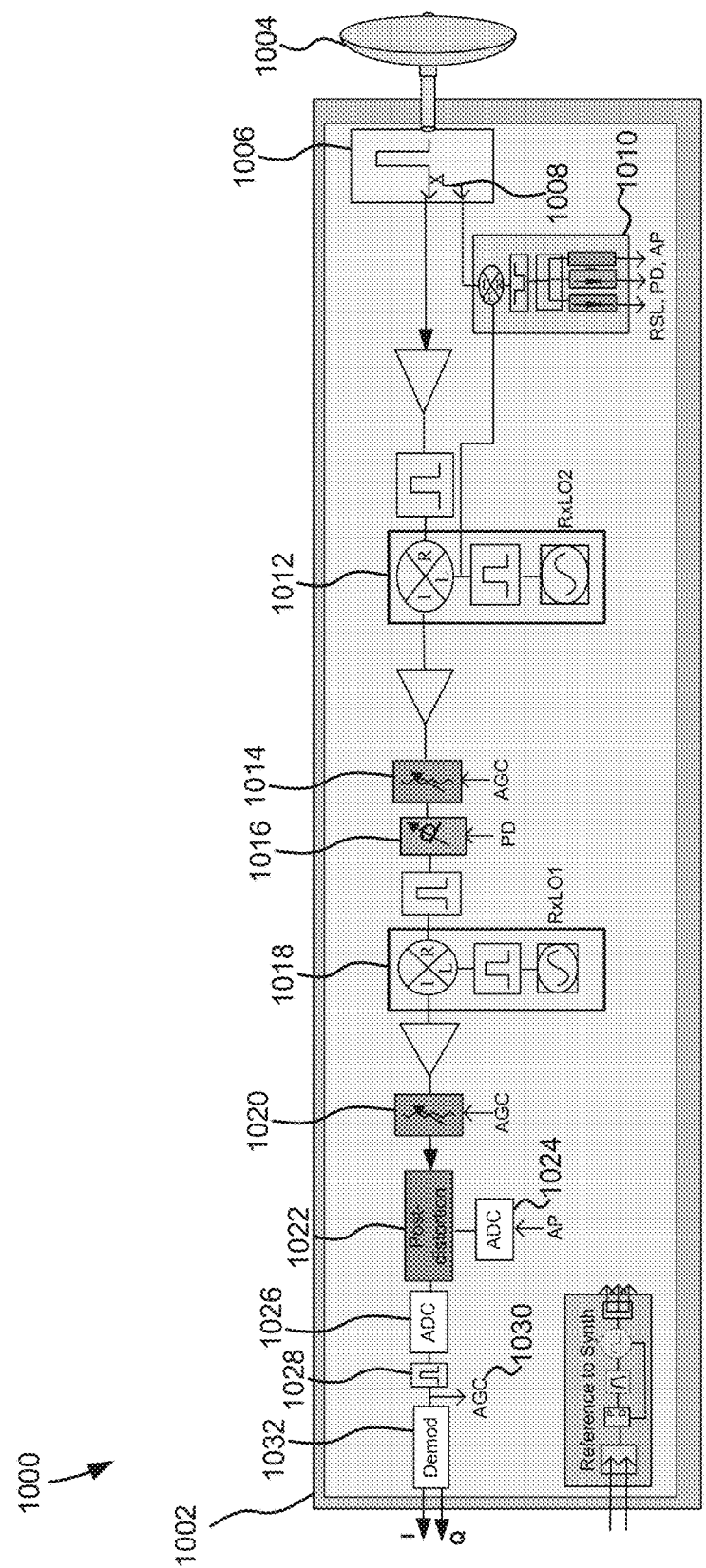
FIG. 10 is an exemplary receiving radio frequency unit with a demodulator and an AGC module in some embodiments.
Figure 11:
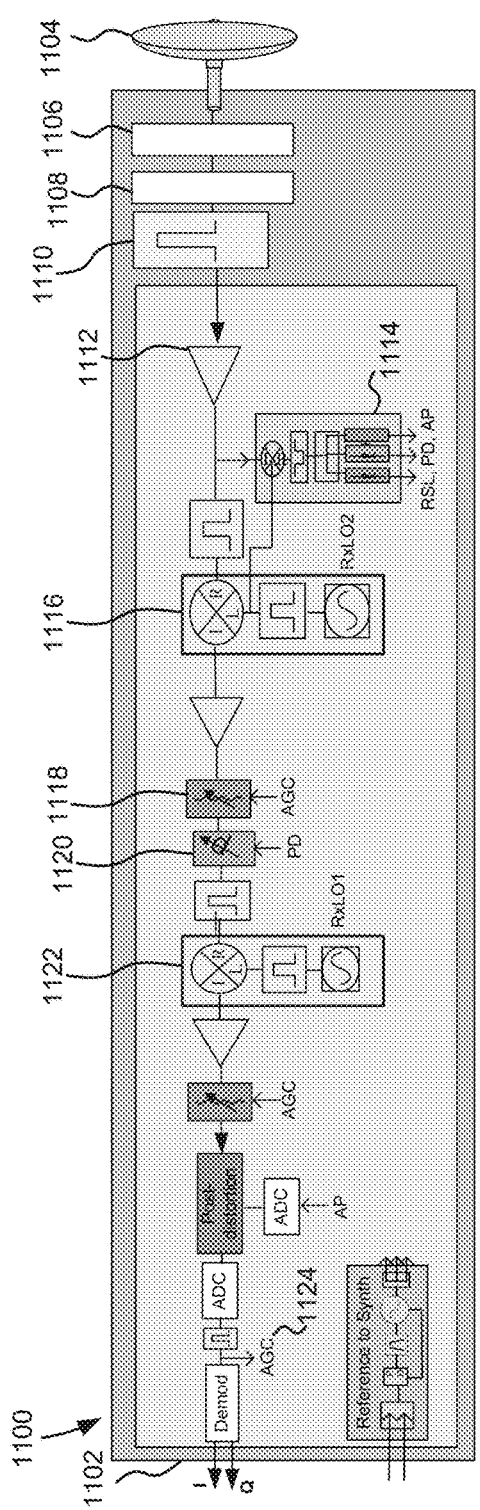
FIG. 11 is another exemplary receiving radio frequency unit with a demodulator and a postdistortion module in some embodiments.
Figure 12:
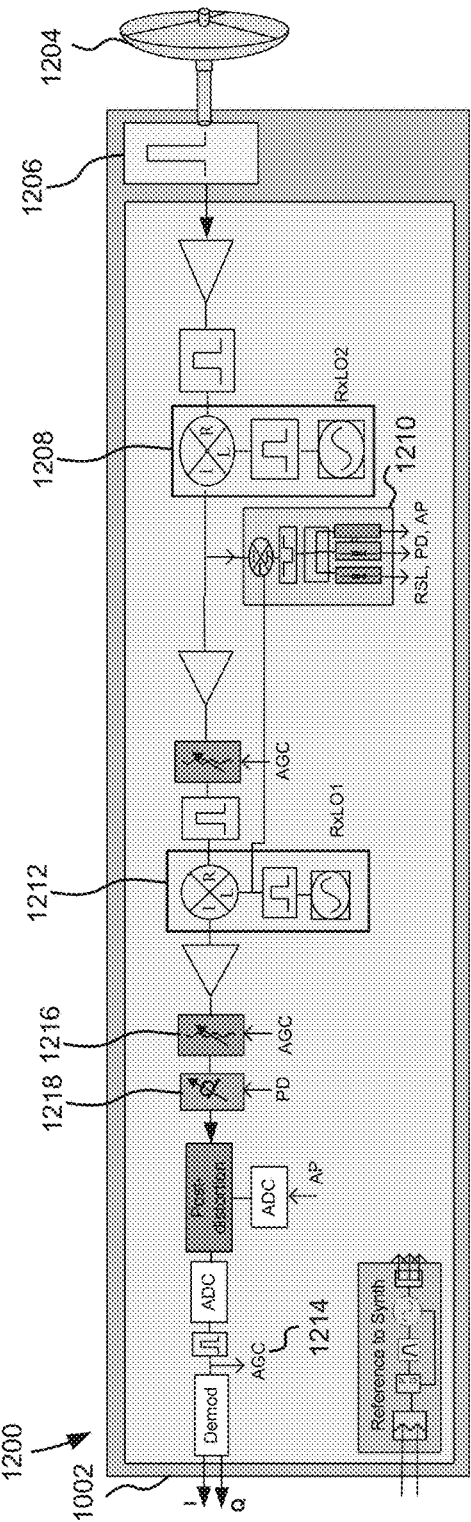
FIG. 12 is further exemplary receiving radio frequency unit with a demodulator and a postdistortion module in some embodiments.

Regarding FIGS. 10, 11, and 12, are directed to a receiving radio frequency unit integrated with a demodulator and an analog-to-digital converter (ADC). Each receiving radio frequency unit may receive the signal from the wireless communication source, propagate the electromagnetic wave energy through a waveguide, and filter the electromagnetic wave energy with a waveguide filter prior to passing the signal through the diplexer. These different architectures may keep hitless protection and regular AGC features.

FIG. 10 is an exemplary receiving radio frequency unit 1002 with a demodulator 1032 and an ADC module 1026 in some embodiments. The receiving radio frequency unit 1002 may be coupled to an antenna 1004. In some embodiments, the receiving radio frequency unit 1002 comprises components similar to receiving radio frequency unit 402 described with regard to FIG. 4.

For example, the receiving radio frequency unit 1002 may comprise a diplexer 1006, coupler 1008, a phase control module 1010, a first downconverter module 1012, an AGC module 1014, a phase adjuster 1016, a second downconverter module 1018, an AGC module 1020, a postdistortion module 1022, an ADC 1024, an ADC module 1026, a filter module 1028, an AGC module 1030, and a demodulator 1032.

As described regarding FIG. 5, a signal may be received by a diplexer 1006 via the antenna 1004. A coupler 1008 may provide the signal to the phase control module 1010. The phase control module 1010 may function in a manner as similar phase control module 414 described with regard to FIG. 4 and phase control module 800 described with regard to FIG. 8. In one example, the phase control module 1010 may mix the signal from the coupler 1008 with the oscillator signal from the first downconverter module 1012 (e.g., from the oscillator of the first downconverter module 1012). The phase control module 1010 may filter and/or compare a phase of the mixed signal with a predetermined phase value to create a phase control signal which controls the phase adjuster 1016.

The downconverter module 1012 may downconvert the signal received from the diplexer 1006. In some embodiments, the signal is filtered, attenuated or amplified prior to downconversion. The downconverter module 1012 may comprise an oscillator module that provides an oscillating signal to a filter and is subsequently mixed with the received signal from the antenna 1004 to downconvert the signal.

The signal may be filtered and the gain adjusted by the AGC module 1014. The phase of the signal may be altered by the phase adjuster 1016 based on the phase control signal from the phase control module 1010. The signal may then be filtered and downconverted by the second downconverter module 1018. Like the downconverter module 1012, the downconvert module 1018 may comprise an oscillator module that provides an oscillating signal to a filter and is subsequently mixed with the signal received from the antenna 1004 to downconvert the signal.

The AGC module 1020 may adjust the gain of the signal after attenuating or amplifying the signal from the downconverter module 1018. The AGC module 1020 may adjust the gain of the filter based on a gain control signal.

The postdistortion module 1022 may receive the signal from the AGC module 1020 and improve the linearity of the signal. In various embodiments, the postdistortion module 1022 inversely models the amplifier's gain and phase characteristics and produces a signal that is more linear and reduces distortion. In one example, "inverse distortion" is introduced to cancel nonlinearity. The postdistortion module 1022 may receive a postdistortion control signal from the phase control module 1010 via the ADC (analog to digital converter) module 1024. In the receiver application, predistortion before the ADC module 1026 may help the overall linearity when receiver with high RSL. The adaptive predistortion may assist the free spurious dynamic range for the ADC, and further minimizes quantization error due to any nonlinearity caused in the receiver chain.

The demodulator module 1032 may receive the signal from the postdistortion module 1022 via the ADC module 1026 and the filter module 1028. The demodulator module 1032 may provide the in-phase (I) and quadrature (Q) signals. The AGC module 1030 may compare the gain of the signal to a predetermined gain value and control the AGC module 1014 and/or the AGC module 1020 to increase or decrease the gain of the signal.

FIG. 11 is another exemplary receiving radio frequency unit 1102 with a demodulator and a postdistortion module in some embodiments. The receiving radio frequency unit 1102 may be coupled to an antenna 1104.

Block diagram 1100 comprises an antenna 1104 and a diplexer 1110 coupled to the waveguide 1106. The waveguide 1106 may provide the signal from the antenna 1104 to the diplexer 1110 via a waveguide filter 1108. The diplexer 1110 may provide the signal to the receiving radio frequency unit 1102. In some embodiments, the receiving radio frequency unit 1102 may comprise the waveguide 1106, the waveguide filter 1108, and/or the diplexer 1110.

In some embodiments, the receiving radio frequency unit 1102 comprises components similar to receiving radio frequency unit 402 described with regard to FIG. 4 and receiving radio frequency unit 1002 described with regard to FIG. 10. The receiving radio frequency unit 1102 may comprise an amplifier/attenuator module 1112, a phase control module 1114, a first downconverter module 1116, a phase adjuster 1120, an AGC module 1118 and an AGC module 1124. Those skilled in the art will appreciate that the receiving radio frequency unit 1102 may comprise other components similar to receiving radio frequency unit 1002 as described with regard to FIG. 10.

Unlike the phase control module 1010 which mixes a signal from a coupler with the downconverted signal from the first downconverter module 1012, the phase control module 1114 receives the signal amplified and/or attenuated by the amplification/attenuator module 1112. The phase control module 1114 may mix the signal from the amplification/attenuator module 1112 with the oscillator signal from the downconverter module 1116, filters the mixed signal, and compares the filtered mixed signal with a predetermined phase value to generate a phase control signal. The phase control signal may control the phase adjuster 1120 to adjust the phase of the signal received by the antenna 1104. The receiving radio frequency unit 1102 may also comprise the AGC module 1124 configured to compare the gain of the signal to a predetermined gain value to generate a gain control signal. The gain control signal may control the AGC module 1116 and/or any other AGC module to increase or decrease the gain of the signal.

FIG. 12 is a further exemplary receiving radio frequency unit 1202 with a demodulator and a postdistortion module in some embodiments. The receiving radio frequency unit 1202 may be coupled to an antenna 1204. In some embodiments, the receiving radio frequency unit 1202 comprises components similar to receiving radio frequency unit 402 described with regard to FIG. 4 and receiving radio frequency unit 1002 described with regard to FIG. 10.

The receiving radio frequency unit 1202 may comprise a diplexer 1206, a first downconverter module 1208, a second downconverter module 1212, a phase control module 1210, an AGC module 1216, a phase adjuster 1218, and an AGC module 1214. Those skilled in the art will appreciate that the receiving radio frequency unit 1202 may comprise other components similar to receiving radio frequency unit 1002 as described with regard to FIG. 10.

Unlike the phase control module 1010 which mixes a signal from a coupler with the downconverted signal from the first downconverter module 1012, the phase control module 1210 may mix a downconverted signal from the first downconverter module 1208 with the oscillator signal from the second downconverter module 1212. The phase control module 1210 filters the mixed signal, and compares the filtered mixed signal with a predetermined phase value to generate a phase control signal. The phase control signal may control the phase adjuster 1218 to adjust the phase of the signal received from the antenna 1204. The receiving radio frequency unit 1202 may also comprise the AGC module 1214 configured to compare the gain of the signal to a predetermined gain value to generate a gain control signal. The gain control signal may control the AGC module 1216 or any other AGC module to increase or decrease the gain of the signal.

Those skilled in the art will appreciate that, like the receiving radio frequency unit 1102 discussed with regard to FIG. 11, the receiving radio frequency unit 1002 and the receiving radio frequency unit 1202 may comprise a waveguide and/or a waveguide filter. The waveguide and/or waveguide filter may operate in a manner as discussed with regard to FIG. 11.

Further, those skilled in the art will appreciate that the receiving radio frequency units of FIGS. 10-12 may provide signals to a signal combiner. The signal combiner may combine the signals of two or more receiving radio frequency units. In some embodiments, the signal combiner combines the inphase (I) signal from two or more receiving radio frequency units and combines the quadrature (Q) signal from two or more receiving radio frequency units.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

What is claimed:

1. A system comprising:
a first receiving radio frequency unit including circuitry configured to
receive via a first antenna a first radio-frequency signal based on a transmitted radio-frequency signal;
downconvert the first radio-frequency signal to a first lower-frequency signal, the first lower-frequency signal being at a first lower-frequency signal phase;
sample the first radio-frequency signal to generate a first sampled radio-frequency signal;
downconvert the first sampled radio-frequency signal to a first sampled lower-frequency signal, the first sampled lower-frequency signal being at a first sampled lower-frequency signal phase;
first compare the first sampled lower-frequency signal phase against a common phase signal to generate a first phase control signal; and
adjust the first lower-frequency signal phase using the first phase control signal to generate a first phase-adjusted signal;
a second receiving radio frequency unit including circuitry configured to receive via a second antenna a second radio-frequency signal based on the transmitted radio-frequency signal, the second antenna being spatially diverse to the first antenna, the second signal being received via the second antenna substantially simultaneously to reception of the first radio-frequency signal via the first antenna;
downconvert the second radio-frequency signal to a second lower-frequency signal, the second lower-frequency signal being at a second lower-frequency signal phase;
sample the second radio-frequency signal to generate a second sampled radio-frequency signal;
downconvert the second sampled radio-frequency signal to a second sampled lower-frequency signal, the second sampled lower-frequency signal being at a second sampled lower-frequency signal phase;
receive the common phase signal from the first receiving radio frequency unit;
second compare the second sampled lower-frequency signal phase against the common phase signal to generate a second phase control signal; and
adjust the second lower-frequency signal phase using the second phase control signal to generate a second phase-adjusted signal, the adjusting causing the second phase-adjusted signal to have substantially the same phase as the first phase-adjusted signal; and a combiner including circuitry configured to
when both the first receiving radio frequency unit and the second receiving radio frequency unit are deemed to be functioning, combine a first output signal and a second output signal into a combined output signal, the first output signal being based on the first phase-adjusted signal, the second output signal being based on the second phase-adjusted signal, and forward the combined output signal for data processing, thereby enabling improved signal strength of the combined output signal over either the first output signal or the second output signal individually; and
when only one of the first receiving radio frequency unit or the second receiving radio frequency unit is deemed to be functioning, forward the first output signal or the second output signal of the functioning one of the first receiving radio frequency unit or the second radio frequency unit for data processing, thereby enabling hitless switching protection when one of the first receiving radio frequency unit or the second receiving radio frequency unit malfunctions.

2. The system of claim 1, wherein the transmitted radio-frequency signal is transmitted from a transmitter towards the first receiving radio frequency unit and the second receiving radio frequency unit.

3. The system of claim 1, wherein the circuitry of the first receiving radio frequency unit is further configured to generate the first phase control signal based on pilot signals received by the first receiving radio frequency unit.

4. The system of claim 1, wherein the circuitry of the first receiving radio frequency unit is further configured to first compare a gain of the first sampled lower-frequency signal to a predetermined gain value to generate a first gain control signal, and to adjust the gain of the first lower-frequency signal based on the first gain control signal, and the circuitry of the second receiving radio frequency unit is further configured to receive the predetermined gain value, to second compare a gain of the second sampled lower-frequency signal to the predetermined gain value to generate a second gain control value, and to adjust the gain of the second lower-frequency signal based on the second gain control signal.

5. The system of claim 4, wherein the circuitry of the first receiving radio frequency unit adjusts the gain of the first lower-frequency signal either before the adjustment of the phase of the first lower-frequency signal or after the adjustment of the phase of the first lower-frequency signal.

6. The system of claim 4, wherein the circuitry of the second receiving radio frequency unit adjusts the gain of the second lower-frequency signal either before the adjustment of the phase of the second lower-frequency signal or after the adjustment of the phase of the second lower-frequency signal.

7. The system of claim 4, wherein the circuitry of the first receiving radio frequency unit is further configured to generate the predetermined gain value based on pilot signals received by the first receiving radio frequency unit.

8. The system of claim 1, wherein the first and second receiving radio frequency units each further comprise a first and second waveguide, respectively, the first and second waveguides configured to propagate the first and second radio-frequency signals from the first and second antenna, respectively, towards the circuitry of the first and second receiving radio frequency units, respectively.

9. The system of claim 1, wherein the first lower-frequency signal comprises an intermediate frequency signal.

10. The system of claim 1, wherein the circuitry of the first receiving radio frequency unit is further configured to downconvert the first lower-frequency signal to generate the first output signal.

11. The system of claim 1, wherein the circuitry of the first receiving radio frequency unit is further configured to receive a request for the first phase control signal from the second receiving radio frequency unit, and cause the first phase control signal to be transmitted to the second receiving radio frequency unit in response to the request.

12. The system of claim 1, wherein the circuitry of the first receiving radio frequency unit is further configured to demodulate the first output signal to generate a first demodulated signal, and the circuitry of the second receiving radio frequency unit is further configured to demodulate the second output signal to generate a second demodulated signal,
the combiner combines the first and second demodulated signals to generate the combined signal, when both the first receiving radio frequency unit and the second receiving radio frequency unit are deemed to be functioning, and
the combiner forwards the first demodulated signal or the second demodulated signal, when only one of the first receiving radio frequency unit or the second receiving radio frequency unit is deemed to be functioning.

13. A method comprising:
when a first receiving radio frequency unit is functioning,
first receiving, via a first antenna of the first receiving radio frequency unit, a first radio-frequency signal based on a transmitted radio-frequency signal;
first downconverting the first radio-frequency signal to a first lower-frequency signal, the first lower-frequency signal being at a first lower-frequency signal phase;
sampling the first radio-frequency signal to generate a first sampled radio-frequency signal;
downconverting the first sampled radio-frequency signal to a first sampled lower-frequency signal, the first sampled lower-frequency signal being at a first sampled lower-frequency signal phase;

first comparing, by the first receiving radio frequency unit, the first sampled lower-frequency signal phase against a common phase signal to generate a first phase control signal; and adjusting, by the first receiving radio frequency unit, the first lower-frequency signal phase using the first phase control signal to generate a first phase-adjusted signal; when a second receiving radio frequency unit is functioning, second receiving, via a second antenna of the second receiving radio frequency unit, a second radio-frequency signal based on the transmitted radio-frequency signal, the second antenna being spatially diverse to the first antenna, the second receiving occurring substantially simultaneously to the first receiving when both the first and second receiving radio frequency units are functioning;

second downconverting the second radio-frequency signal to a second lower-frequency signal, the second lower-frequency signal being at a second lower-frequency signal phase;

sampling the second radio-frequency signal to generate a second sampled radio-frequency signal;

downconverting the second sampled radio-frequency signal to a second sampled lower-frequency signal, the second sampled lower-frequency signal being at a second sampled lower-frequency signal phase;

receiving, by the second receiving radio frequency unit, the common phase signal from the first receiving radio frequency unit;

second comparing, by the second receiving radio frequency unit, the second sampled lower-frequency signal phase against the common phase signal to generate a second phase control signal; and adjusting, by the second receiving radio frequency unit, the second lower-frequency signal phase using the second phase control signal to generate a second phase-adjusted signal, the adjusting causing the second phase-adjusted signal to have substantially the same phase as the first phase-adjusted signal;

when both the first receiving radio frequency unit and the second receiving radio frequency unit are deemed to be functioning, combining, by a combiner, a first output signal and a second output signal into a combined output signal, the first output signal being based on the first phase-adjusted signal, the second output signal being based on the second phase adjusted signal; and forwarding the combined output signal for data processing, thereby enabling improved signal strength of the combined output signal over either the first output signal or the second output signal individually; and when only one of the first receiving radio frequency unit or the second receiving radio frequency unit is deemed to be functioning, forwarding the first output signal or the second output signal of the functioning one of the first receiving radio frequency unit or the second radio frequency unit for data processing, thereby enabling hitless switching protection when one of the first receiving radio frequency unit or the second receiving radio frequency unit malfunctions.

14. The method of claim 13, wherein the transmitted radio-frequency signal is transmitted from a transmitter towards the first receiving radio frequency unit and the second receiving radio frequency unit.

15. The method of claim 13, further comprising receiving, by the first receiving radio frequency unit, pilot signals and generating, by the first receiving radio frequency unit, the first phase control signal based on the pilot signals.

16. The method of claim 13, further comprising:
first comparing, by the first receiving radio frequency unit, a gain of the first sampled lower-frequency signal to a predetermined gain value to generate a first gain control signal;

adjusting, by the first receiving radio frequency unit, the gain of the first lower-frequency signal based on the first gain control signal;

receiving, by the second receiving radio frequency unit, the predetermined gain value;

second comparing, by the second receiving radio frequency unit, a gain of the second sampled lower-frequency signal to the predetermined gain value to generate a second gain control value; and adjusting, by the second receiving radio frequency unit, the gain of the second lower-frequency signal based on the second gain control signal.

17. The method of claim 16, wherein the adjustment of the gain of the first lower-frequency signal is carried out either before the adjustment of the phase of the first lower-frequency signal or after the adjustment of the phase of the first lower-frequency signal.

18. The method of claim 16, wherein the adjustment of the gain of the second lower-frequency signal is carried out either before the adjustment of the phase of the second lower-frequency signal or after the adjustment of the phase of the second lower-frequency signal.

19. The method of claim 16, further comprising generating, by the first receiving radio frequency unit, the predetermined gain value based on pilot signals received by the first receiving radio frequency unit.

20. The method of claim 13, further comprising:
propagating the first radio-frequency signal from the first antenna through a first waveguide to the first receiving radio frequency unit;

filtering the first radio-frequency signal with a first waveguide filter;

propagating the second radio-frequency signal from the second antenna through a second waveguide; and filtering the second radio-frequency signal with a second waveguide filter.

21. The method of claim 13, wherein the first lower-frequency signal comprises an intermediate frequency signal.

22. The method of claim 21, further comprising:
downconverting, by the first receiving radio frequency unit, the first lower-frequency signal to generate the first output signal.

23. The method of claim 13, further comprising:
receiving, by the first receiving radio frequency unit, a request for the first phase control signal from the second receiving radio frequency unit; and transmitting, by the first receiving radio frequency unit, the first phase control signal to the second receiving radio frequency unit, in response to the request.

24. The method of claim 13, further comprising:
when the first receiving radio frequency unit is functioning, demodulating the first output signal to generate a first demodulated signal; and when the second receiving radio frequency unit is functioning, demodulating the second output signal to generate a second demodulated signal, wherein when both the first receiving radio frequency unit and the second receiving radio frequency unit are deemed to be functioning, the first and second demodulated signals are combined to generate the combined signal; and wherein when only one of the first receiving radio frequency unit or the second receiving radio frequency unit is deemed to be functioning, the first demodulated signal or the second demodulated signal is forwarded.

* * * * *